United States Patent [19]
Fujiki et al.

[11] Patent Number: 4,874,645
[45] Date of Patent: Oct. 17, 1989

[54] PLASTIC STRUCTURAL MEMBER

[75] Inventors: Hiroyuki Fujiki, Fujisawa; Yoshiharu Michiura, Chigasaki; Kiyoshi Inoue, Isehara, all of Japan

[73] Assignees: Nissan Motor Co., Ltd., Yokohama; Ichikoh Industries Limited, Tokyo, both of Japan

[21] Appl. No.: 43,403

[22] Filed: Apr. 28, 1987

[30] Foreign Application Priority Data

Apr. 30, 1986 [JP] Japan ............................... 61-101609

[51] Int. Cl.⁴ ............................................. B60R 13/00
[52] U.S. Cl. ......................................... 428/31; 428/12; 428/57; 428/60
[58] Field of Search ..................... 428/31, 12, 192, 44, 428/57, 60

[56] References Cited

U.S. PATENT DOCUMENTS

| | | | |
|---|---|---|---|
| 3,471,355 | 10/1969 | Truesdell et al. | 428/31 X |
| 3,577,626 | 5/1971 | Link | 428/31 X |
| 3,711,360 | 1/1973 | Kent | 428/31 X |
| 3,982,780 | 9/1976 | Keith | 428/31 X |
| 4,246,303 | 1/1981 | Townsend | 428/31 |
| 4,690,446 | 9/1987 | Warren | 428/72 X |

FOREIGN PATENT DOCUMENTS

| | | | |
|---|---|---|---|
| 1955409 | 5/1971 | Fed. Rep. of Germany . | |
| 0141948 | 8/1983 | Japan | 428/31 |

*Primary Examiner*—Nancy A. B. Swisher
*Attorney, Agent, or Firm*—Foley & Lardner, Schwartz, Jeffery, Schwaab, Mack, Blumenthal & Evans

[57] ABSTRACT

A finisher installed at the rear end of an automotive vehicle body. The finisher is comprised of two plate-like plastic parts which are joined at a parting plane with each other. The two plate-like plastic parts have respectively outer surfaces which are planarly aligned with each other to form a common flat outer surface. At least one of the two plate-like plastic parts is colored. The parting plane includes a horizontal flat narrower section which is generally perpendicular to the outer surface, and an inclined flat wider section contiguous to the horizontal section and inclined relative to the outer surface in such a manner as to form an acute angle between it and the outer surface defining the colored plastic part, thereby improving the strength and appearance of the finisher.

15 Claims, 4 Drawing Sheets

PLASTIC STRUCTURAL MEMBER

BACKGROUND OF THE INVENTION

1. Field of the Invention

The present invention relates generally to an improvement in a plastic structural member such as an automotive vehicle body finisher, and more particularly to a joining structure between plastic parts constituting the plastic structural member.

2. Description of the Prior Art

Recently automotive vehicles have been increasingly provided with a so-called finisher, for example, installed in the rear end of the automotive vehicle body and located between a pair of stoplight assemblies. The finisher is frequently formed by using transparent or semitransparent plastic material such as acrylic resin or polycarbonate in order to provide impression of higher grade to the finisher. Additionally, the finisher is usually constructed, for example, of two plate-like parts joined together to form a one-piece plate type finisher and produced by a so-called simultaneous moulding in which a previously moulded one of the two parts is set in a mould forming a space corresponding to the other part, and then molten plastic material is poured into the space thereby to mould the other part in contact with the previously moulded part. In the thus moulded finisher, the two plate-like parts are in secure contact with each other at a generally flat parting plane.

However the following difficulties have been encountered in such a finisher: The flat parting plane between the two plate-like parts provides a less joining area and accordingly a less joining strength between the two plate-like parts, which may bring the finisher to its breakdown upon acting of force by person's hands. In case where one of the plate-like parts is formed of transparent or semitransparent plastic material, the parting plane can be seen through the transparent or semitransparent one, thus deteriorating appearance of the finisher. Additionally, a gas accumulation tends to be made in the poured plastic material during the simultaneous moulding. This gas accumulation looks whitish after the molten plastic material is solidified, thereby degrading appearance of the finisher.

SUMMARY OF THE INVENTION

A plastic structural member according to the present invention is comprised of first and second plastic parts which are joined through a parting plane with each other. The first and second plastic parts respectively have surfaces which are planarly aligned with each other to form a common outer surface. At least one of the first and second plastic parts is coloured. The parting plane includes a first section generally perpendicular to the outer surface, and a second section contiguous to said first section and inclined relative to the outer surface.

Accordingly, the curved parting plane increases the joining area and accordingly the joining strength between the first and second plastic parts, thereby preventing breakdown of the plastic structural member even upon acting of force by person's hands. The parting plane includes the inclined section which is difficult to be seen even in case where one of the first and second plastic parts is transparent or semitransparent, and therefore the plastic structural member can be prevented from being deteriorated in appearance. Additionally, during production by the simultaneous moulding, molten plastic material of one of the plastic parts flows along the parting plane inclined section and is forcibly filled into whole the space corresponding to the plastic part. This prevents making of gas accumulation in the molten plastic material, thus preventing the parting plane from looking whitish and therefore improving appearance of the plastic constructional member such as an automotive vehicle body finisher.

DETAILED DESCRIPTION OF THE INVENTION

Figure 1:
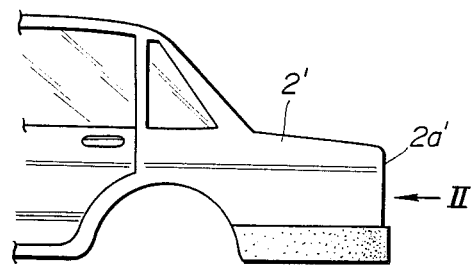
FIG. 1 is a schematic side view of a rear part of an automotive vehicle body.
Figure 2:
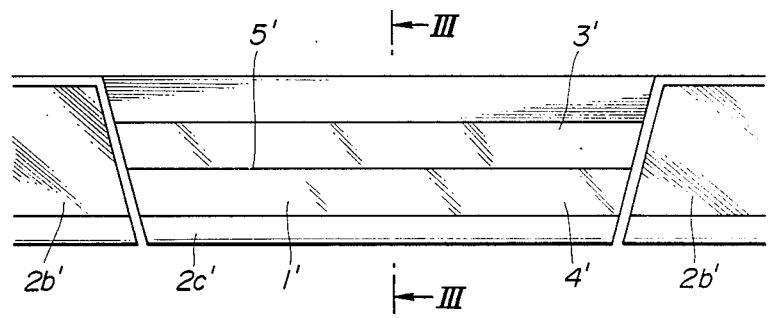
FIG. 2 is a front view of a conventional finisher installed at the rear end of the automotive vehicle body, as viewed from the direction of an arrow II of FIG. 1.
Figure 3:
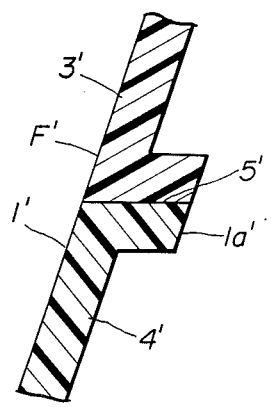
FIG. 3 is a fragmentary sectional view of the finisher taken in the direction of arrows substantially along the line III—III of FIG. 2.

To facilitate understanding the present invention, a brief reference will be made to a conventional finisher 1' as a plastic structural member used in an automotive vehicle body 2', depicted in FIGS. 1 to 3. Referring to FIGS. 1 and 2, the finisher 1' is securely disposed at the rear end 2a' of the vehicle body 2' and located between a pair of stoplight assemblies 2b', 2b'. The finisher 1' extends laterally and installed in such a manner as to cover a depression 2c' formed in the panel of the vehicle body rear end 2a'. The finisher 1' is formed partly of transparent or semitransparent plastic material and constructed of two plate-like parts 3', 4'. One of the parts 3', 4' is transparent or semitransparent in the natural state of the plastic material while the other is coloured. The plate-like parts 3', 4' are securely joined with each other to form a one-piece plate-like member having a flat outer surface F' as shown in FIG. 3. The plate-like parts 3', 4' are joined with each other at a parting plane 5' which is generally horizontal as shown in FIG. 3. In the state where the finisher 1' is installed in position. The sections of the plate-like parts 3', 4' near the parting plane 5' project rearwardly to form a laterally extending projection 1a' in order to increase the joining area between the plate-like parts 3', 4'.

Now such an automotive vehicle body finisher has been recently frequently produced using transparent or semitransparent plastic material such as acrylic resin or polycarbonate in order to provide impression of higher grade. Additionally, a variety of colours have been applied to the plastic material. In this connection, its has been carried out that the differently coloured two plate-like parts 3', 4' are simultaneously moulded by a so called simultaneous moulding process in which one of the two parts 3', 4' may be transparent or semitransparent in the natural state of the plastic material. This is because the number of steps for production extremely increases unavoidably in case of production by a traditional masking painting process in which one of the two parts 3', 4' is masked while the other is painted. Thus, the above-mentioned simultaneous molding process is particularly effective for the automotive finisher constructed of differently coloured plural plate-like parts.

Figure 4:
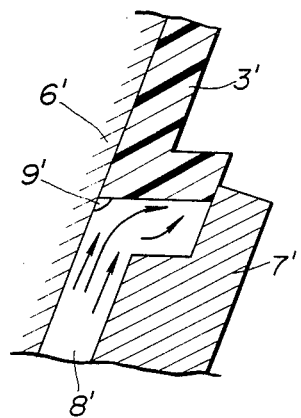
FIG. 4 is a sectional view similar to FIG. 3 but showing a production process of the finisher of FIG. 2.

However, the following difficulties have been encountered in the automotive finisher produced by such a simultaneous moulding process since the finisher is disposed on the outer surface of the automotive vehicle body and therefore it is exposed to person's eyes and hand-contacts. First, the parting plane 5' of the parts 3', 4' is generally flat and accordingly the joining area between the parts 3', 4' is smaller though the laterally extending projection 1a' is formed. Accordingly, the finisher 1' is lower in strength particularly when vertical force by person's hands is applied to it, which may bring it to breakdown. Second, in case where one of the plate-like parts 3', 4' is transparent or semitransparent while the other is coloured, the joining plane 5' of the coloured part can be seen through the transparent or semitransparent part, thereby deteriorating appearance of the finisher. Third, when the plate-like parts 3', 4' are simultaneously moulded, the previously moulded part 3' is first set between moulds 6', 7' as shown in FIG. 4, and molten resin or plastic material is then poured into a space 8' corresponding to the other part 4' which space is defined among the part 3' and the moulds 6', 7'. In this moulding process, the molten plastic material flows in the direction of arrows but stagnates at a place corresponding to the vicinity of the front end section of the parting plane 5' so as to form a gas accumulation 9'. This gas accumulation 9' causes the joining plane 5' to look whitish through the outer surface F after being solidified, thus degrading appearance of the finisher 1'.

Figure 6:
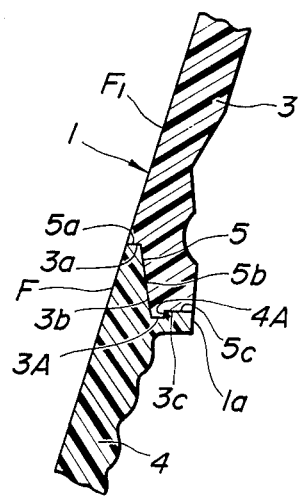
FIG. 6 is a fragmentary enlarged view of a part enclosed in a circle VI of FIG. 5.
Figure 5:
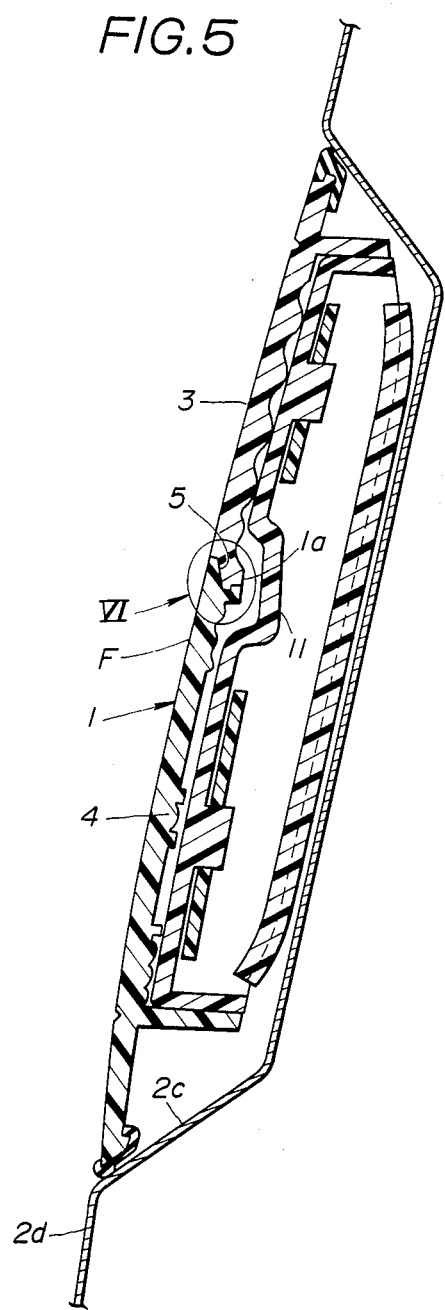
FIG. 5 is a vertical sectional view of an embodiment of a finisher according to the present invention, installed in position in an automotive vehicle body.

In view of the above description of the conventional automotive vehicle body finisher 1', reference is now made to FIGS. 5 and 6, wherein a preferred embodiment of an automotive vehicle body finisher of the present invention is illustrated by the reference numeral 1. In FIGS. 5 and 6, like reference numerals as in FIGS. 1 to 3 designate corresponding elements and parts. The finisher 1 is securely disposed to cover a depression 2c formed in a body panel 2d of a rear end of an automotive vehicle body and extends laterally relative t the vehicle body. In this embodiment, the finisher 1 is securely supposed through a bracket 11 to the vehicle body and formed transparent or semitransparent plastic material such as acrylic resin or polycarbonate. The finisher 1 is constructed of a upper plate-like part 3 which is transparent or semitransparent, and a lower plate-like part 4 which is coloured. The upper and lower plate-like parts 3, 4 are joined at a parting plane 5 with each other with no gap or clearance therebetween to form a one-piece plate-like member or the finisher 1. The upper and lower plate-like parts 3, 4 are planarly aligned to form a generally flat outer surface F.

As best seen from FIG. 6, the parting plane 5 includes a laterally extending narrow horizontal section 5a which is flat and generally perpendicular to the outer surface F. A laterally extending inclined section 5b of the parting plane 5 is contiguous to the horizontal section 5a and flat, and inclined relative to the outer surface F. Additionally, another horizontal section 5c of the parting plane 5 is contiguous to the inclined section 5b and flat, and generally perpendicular to the outer surface F. More specifically, the upper plate-like part 3 is formed with a laterally extending flat surface 3a contiguous to the outer surface $F_1$ of the upper plate-like part 3 and generally perpendicular to the outer surface $F_1$. A laterally extending flat surface (no numeral) of the lower part-like plate 4 corresponding to the surface 3a is in secure contact with the surface 3a of the upper plate-like part 3, forming the parting plane horizontal section 5a. A laterally extending flat surface 3b of the upper plate-like part 3 is contiguous to the surface 3a and inclined relative to the outer surface F. A laterally extending flat surface (no numeral) of the lower plate-like part 4 corresponding to the surface 3b is in secure contact with the surface 3b of the inclined section 5b is so inclined that an acute upper plate-like part 3, forming the parting plane inclined section 5b.

A laterally extending flat surface 3c of the upper plate-like part 3 is contiguous with the surface 3b and is generally perpendicular to the outer surface F. A laterally extending surface (no numeral) of the lower plate-like part 4 corresponding to the surface 3c is in secure contact with the surface 3c of the upper plate-like part 3, forming the parting plane horizontal section 5b. In this embodiment, the width (or length in FIG. 6) of the parting plane horizontal section 5c is larger than the horizontal section 5a and smaller than the inclined section 5b. It is to be noted that the parting plane angle is formed between it and the outer surface F (defining the coloured part 4) while an obtuse angle is formed between it and the outer surface F (defining the transparent or semitransparent part 3).

As shown, the upper plate-like part 3 is formed with a laterally extending projection 3A which is located in a position at which the surfaces 3b, 3c are contiguous to each other. The lower plate-like part 4 is formed with a laterally extending groove 4A which is located in a position corresponding to that of the projection 3A and securely engages with the projection 3A. The upper and lower plate-like parts 3, 4 are projected outwardly at their section near the parting plane 5 to form a laterally extending projection 1a in order to obtain a larger joining area therebetween.

With the thus configurated finisher 1, the parting plane 5 between the upper and lower plate-like parts 3, 4 includes the inclined section 5b and therefore joining strength between the upper and lower plate-like parts 3, 4 increases in addition to the effect of the projection 1a. This strengthens the finisher 1 against vertical force applied thereto, so that the finisher 1 is prevented from its breakdown even when force is applied thereto by person's hands. It will be understood that the engaged projection 3A and groove 4A contributes to a further increase in joining strength between the upper and lower plate-like parts 3, 4.

Figure 7:
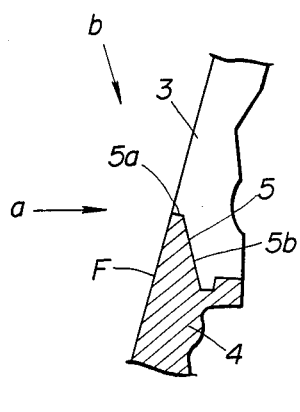
FIGS. 7 and 8 are sectional views similar to FIG. 6 but showing the effect of the present invention.
Figure 8:
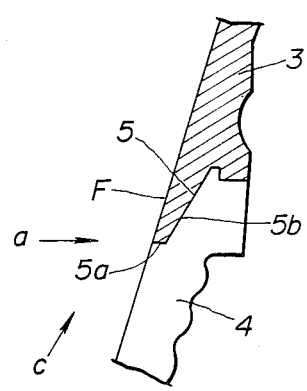

In case where the upper plate-like part 3 is transparent or semitransparent while the lower plate-like part 4 is coloured as clearly illustrated in FIG. 7, when the parting plane 5 is viewed from the direction of an arrow a, it looks like a line so that a clear separation is made between the upper and lower plate-like parts 3, 4 thereby to provide good appearance. Additionally, when the parting plane 5 is viewed from the obliquely upward direction or the direction of an arrow b, person's glance is generally aligned with the parting plane inclined section 5b and therefore the parting plane 5 with the colour of the lower plate-like part 4 can hardly be seen through the upper plate-like part 3, thereby preventing the finisher 1 from being degraded in appearance. Otherwise, in case where the upper late-like part 3 is coloured while the lower plate-like part 4 is transparent or semitransparent as illustrated in FIG. 8, the finisher 1 can provide good appearance when the parting plane 5 is viewed not only from the direction of the arrow a but also from the direction of an arrow c. In this case, although the shapes of the surfaces forming the parting plane 5 of the upper and lower plate-like parts 3, 4 are contrary to in the case of FIG. 7, the configuration is the same as that of FIG. 7 in such a point that the parting plane inclined section 5b is so inclied that an acute angle is formed between it and the outer surface F (defining the coloured part 3) while an obtuse angle is formed between it and the outer surface F (defining the transparent or semitransparent part 4).

Figure 9:
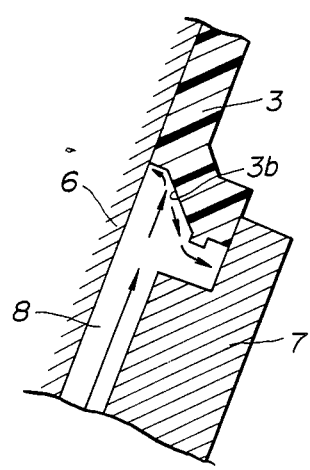
FIG. 9 is a sectional view similar to FIG. 6 but showing a production process of the finisher of FIG. 5, illustrating the effect of the present invention.

Furthermore, in case where the upper and lower plate-like parst 3, 4 are simultaneously moulded, molten plastic material is poured, for a secondary moulding, into a space 8 corresponding to the lower plate-like part 4 after the upper plate-like part 3 formed in a primary moulding is set between moulds 6, 7, in which the molten plastic material flows as indicated by arrows to strike against the inclined surface 3b corresponding to the parting plane inclined section 5b as shown in FIG. 9. Thus, the molten plastic material is bifurcated to flow in the opposite directions along the inclined surface 3b, so that the molten plastic material forcibly reaches a location corresponding to the vicinity of front end of the parting plane 5 without being stagnated. This prevents formation of the gas accumulation encountered in connection with the conventional automotive vehicle body finisher 1' as shown in FIGS. 1 to 3. As a result, the parting plane of the finisher 1 is prevented from looking whitish through the outer surface F after the molten plastic material is solidified.

Figure 10:
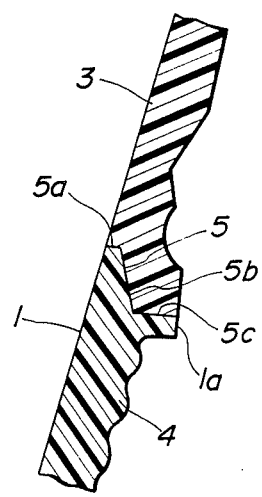
FIG. 10 is a sectional view similar to FIG. 6 but showing another embodiment of the finisher according to the present invention.

While the above-discussed embodiment has been so shown and described that the projection 3A and the groove 3B are formed respectively in the upper and lower plate-like parts 3, 4, it will be appreciated that such projection and goove may be omitted as shown in FIG. 10. Furthermore, although one of the two plate-like parts 3, 4 has been shown and described as being transparent or semitransparent in the natural state of crude plastic material, it will be understood that both the plate-like parts 3, 4 may be coloured. Moreover, the finisher has been shown and described being constructed of two plate-like parts 3, 4 in the above-discussed embodiment, it will be appreciated that the principle of the present invention is applicable to the finisher constructed of three or more plate-like parts. Additionally, it will be understood that the principle of the present invention is also applicable to a variety of plastic structural members other than the automotive vehicle body finisher.

What is claimed:

1. An automotive vehicle body plastic finisher comprising:
   first and second plastic parts joined at a parting plane with each other with no gap therebetween and having respective surfaces which are planarly aligned with each other to form a common outer surface, at least one of said first and second plastic parts being coloured, said first and second plastic parts and said parting plane extending generally horizontally, said common outer surface being generally vertical;
   said parting plane including a first section generally perpendicular to said outer surface; and
   a second section contiguous to said first section and inclined relative to said outer surface.

2. A plastic structural member as claimed in claim 1, wherein said parting plane second section is longer than said parting plane first section in a vertical plane perpendicular to said outer surface.

3. A plastic structural member as claimed in claim 2, wherein said second plastic part is coloured, said parting plane second section being so inclined that an acute angle is formed between it and said outer surface defining a coloured one of said first and second parts in said vertical plane.

4. A plastic structural member comprising
   first and second plastic parts joined at a parting plane with each other with no gap therebetween and respectively having surfaces which are planarly aligned with each other to form a common outer surface, at least one of said plastic parts being coloured,
   said first plastic part having a first surface generally perpendicular to said outer surface, and a second surface contiguous to said first surface and inclined relative to said outer surface,
   said second plastic part having a third surface generally perpendicular to said outer surface, and a fourth surface contiguous to said third surface and inclined relative to said outer surface,
   said first and third surfaces being in secure contact with each other to define a first section of said parting plane, said first section being generally perpendicular to said outer surface, said second and fourth surfaces being in secure contact with each other to define a second section of said parting plane, said second section being contiguous with said first section and inclined relative to said outer surface.

5. A plastic structural member as claimed in claim 4, wherein said first plastic part has a fifth surface contiguous to said second surface and inclined relative to said outer surface, and said second plastic part has a sixth surface contiguous to said fourth surface and inclined relative to said outer surface, said fifth and sixth surfaces being in secure contact with each other to define a third section of said parting plane, said third section being contiguous to said second section and inclined relative to said outer surface.

6. A plastic structural member as claimed in claim 4, wherein said first and second plastic parts are plate-like so that said plastic structural member is of one-piece and plate type upon said first and second plastic parts being joined with each other. claim 4, wherein said plastic structural member is produced by first moulding said first plastic part, second setting said first plastic part in a mould in which a space corresponding to said second plastic part is formed between the first plastic part and the inner surface of the mould, and third pouring molten plastic material into said space.

7. A plastic structure member as claimed in claim 6, wherein said plate type plastic structural member is disposed to cover a depression formed in a panel of an automotive vehicle body and located in a rear end of the vehicle body.

8. A plastic structural member as claimed in claim 5, wherein said first and second plastic parts are respectively formed with projections projecting in a direction opposite to said outer surface so that at least a part of each of said fifth and sixth surfaces forming a part of each projection.

9. A plastic structural member as claimed in claim 5, wherein each of said fifth and sixth surfaces is generally flat and laterally straight extends.

10. A plastic structural member as claimed in claim 5, wherein said first plastic part is formed with a projection located in a position at which said second and fifth surfaces are contiguous to each other, and said second plastic part is formed with a groove located in a position at which said fourth and sixth surfaces are contiguous to each other, said projection engaging with said groove.

11. A plastic structural member as claimed in claim 4, wherein each of said first, second, third, and fourth surfaces generally flat and laterally extends so that said parting plane is generally flat and laterally straight extends, said outer surface being generally flat.

12. A plastic structural member as claimed in claim 4, wherein said second plastic part is coloured, said fourth surface being so inclined that an acute angle is formed between it and said outer surface.

13. A plastic structural member as claimed in claim 4, wherein each of said second and fourth surfaces is larger in width than each of said first and third surfaces.

14. A plastic structural member as claimed in claim 4, wherein said plastic structural member is produced by first moulding said first plastic part, second setting said first plastic part in a mould in which a space corresponding to said second plastic part is formed between the first plastic part and the inner surface of the mould, and third pouring molten plastic material into said space.

15. An automotive vehicle body plastic finisher comprising:
    first and second plastic parts joined or contacted at a parting plane with each other with no gap therebetween and having respective surfaces which are planarly aligned with each other to form a common outer surface, one of said first and second plastic parts being coloured, one of said first and second plastic parts being transparent;
    said first and second plastic parts and said parting plane extending generally horizontally;
    said common outer surface being generally vertical;
    said parting plane including a first section generally perpendicular to said outer surface; and
    a second section contiguous to said first section and inclined relative to said outer surface.

* * * * *